US012270362B1

(12) United States Patent
Surapaneni et al.

(10) Patent No.: US 12,270,362 B1
(45) Date of Patent: Apr. 8, 2025

(54) SYSTEM FOR SELECTIVE LIQUID COOLING OF AN AIR INTAKE DUCT

(71) Applicant: FCA US LLC, Auburn Hills, MI (US)

(72) Inventors: Sreekanth Surapaneni, Oakland, MI (US); Uday Kiran Mahakali, Novi, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/591,162

(22) Filed: Feb. 29, 2024

(51) Int. Cl.
*F02M 31/04* (2006.01)
*F02M 31/07* (2006.01)

(52) U.S. Cl.
CPC .......... *F02M 31/042* (2013.01); *F02M 31/07* (2013.01)

(58) Field of Classification Search
CPC ............................ F02M 31/042; F02M 31/07
See application file for complete search history.

(56) References Cited

U.S. PATENT DOCUMENTS

| | | | | | |
|---|---|---|---|---|---|
| 2,756,730 | A * | 7/1956 | Patchan | F02M 1/00 123/41.51 |
| 7,322,192 | B2 | 1/2008 | Sheidler et al. | |
| 9,394,858 | B2 | 7/2016 | Richards et al. | |
| 2010/0191417 | A1* | 7/2010 | Murahashi | B60B 11/06 184/26 |
| 2014/0260208 | A1* | 9/2014 | Sato | B01J 37/0246 60/286 |

* cited by examiner

*Primary Examiner* — Jacob M Amick
*Assistant Examiner* — Charles J Brauch
(74) *Attorney, Agent, or Firm* — Jeremy J. Klobucar

(57) ABSTRACT

A vehicle system, includes an air intake assembly including an inlet through which air flows, a filter downstream of the inlet, and an outlet downstream of the filter through which air from the filter flows, a liquid source, a valve, a temperature indicator and a controller. The valve is electrically actuated and arranged to selectively permit liquid flow from the liquid source to the air intake assembly. The temperature indicator provides an indication of a temperature in the air intake assembly upstream of the filter. And the controller is communicated with the temperature indicator and the valve and operable to open the valve when the output of the temperature indicator indicates a temperature above a temperature threshold.

20 Claims, 3 Drawing Sheets

SYSTEM FOR SELECTIVE LIQUID COOLING OF AN AIR INTAKE DUCT

FIELD

The present disclosure relates to a system for selectively cooling with a liquid an air intake duct of an engine air intake assembly.

BACKGROUND

Vehicles include an air intake through which air is routed to an engine to support combustion in the engine. In certain conditions, air provided to the engine is at an elevated temperature. Air at higher temperatures has less density and higher temperature air flow to the engine can negatively impact engine efficiency and performance.

SUMMARY

In at least some implementations, a vehicle system, includes an air intake assembly including an inlet through which air flows, a filter downstream of the inlet, and an outlet downstream of the filter through which air from the filter flows, a liquid source, a valve, a temperature indicator and a controller. The valve is electrically actuated and arranged to selectively permit liquid flow from the liquid source to the air intake assembly. The temperature indicator provides an indication of a temperature in the air intake assembly upstream of the filter. And the controller is communicated with the temperature indicator and the valve and operable to open the valve when the output of the temperature indicator indicates a temperature above a temperature threshold.

In at least some implementations, the valve is closed when the temperature in the air intake assembly upstream of the filter is below the temperature threshold.

In at least some implementations, the liquid source is a cooling circuit associated with an engine of the vehicle and wherein the liquid flows from the cooling circuit to the valve.

In at least some implementations, the air intake assembly includes a housing that defines an intake duct between the inlet and the filter, and wherein the liquid is routed through a passage arranged in heat transfer relationship with the intake duct. In at least some implementations, the passage is defined at least in part within a wall that defines at least part of the intake duct. In at least some implementations, the passage is defined at least partially within a heat exchanger arranged within the intake duct, wherein the liquid flowing in the heat exchanger is maintained separate from air flowing through the intake duct.

In at least some implementations, a pump moves the liquid under pressure from the liquid source and to the valve.

In at least some implementations, the temperature indicator is responsive to a temperature between the inlet and the filter within a housing of the air intake assembly.

In at least some implementations, the temperature indicator is a sensor responsive to a temperature associated with the liquid, or with an engine of the vehicle, or wherein the temperature indicator provides information regarding an ambient temperature outside of the vehicle.

In at least some implementations, a method of selectively increasing the temperature within an air intake for an engine, includes determining a temperature, comparing the temperature to a temperature threshold, and providing flow of a liquid from a liquid source to an intake duct of an air intake assembly when the determined temperature does not satisfy the temperature threshold.

In at least some implementations, providing the flow of the liquid is accomplished by opening a valve to permit the liquid to flow through the valve to the intake duct. In at least some implementations, the valve includes a solenoid, and the valve is opened by providing electricity to the valve and the valve is located at least partly in a conduit between the liquid source and the intake duct.

In at least some implementations, the flow of the liquid is provided for a predetermined period of time, and wherein the valve is closed after the predetermined period of time. In at least some implementations, the period of time varies as a function of the magnitude of a difference between the temperature and the temperature threshold.

In at least some implementations, the liquid source is a cooling circuit including a heat exchanger of the vehicle. In at least some implementations, the liquid in the cooling circuit flows to and from an engine of the vehicle.

In at least some implementations, the method includes determining a temperature of the liquid and wherein the step of providing the flow of liquid occurs when the determined temperature does not satisfy the temperature threshold and when the temperature of the liquid is below a liquid temperature threshold. In at least some implementations, the determined temperature is a temperature of air within the intake duct.

In at least some implementations, the determined temperature does not satisfy said temperature threshold when the determined temperature is above said temperature threshold, and wherein the liquid temperature threshold is less than said temperature threshold.

In the system and method, liquid that is used to cool components of the vehicle can be routed to the intake duct of an air intake assembly to decrease the temperature thereof. This may help to reduce the temperature of air within the intake duct to increase the density of the air provided to the engine or to, for example, a turbocharger of the engine, and increase the efficiency and performance of the engine. The system and method can selectively provide the cooled liquid to the air intake assembly to cool air in the assembly when desired, for example, when the air temperature in the intake duct is greater than the temperature of the coolant that can be provided thereto. The system can be conveniently developed to take advantage of cooling sources already present in the vehicle to improve performance of the air intake assembly and the engine.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
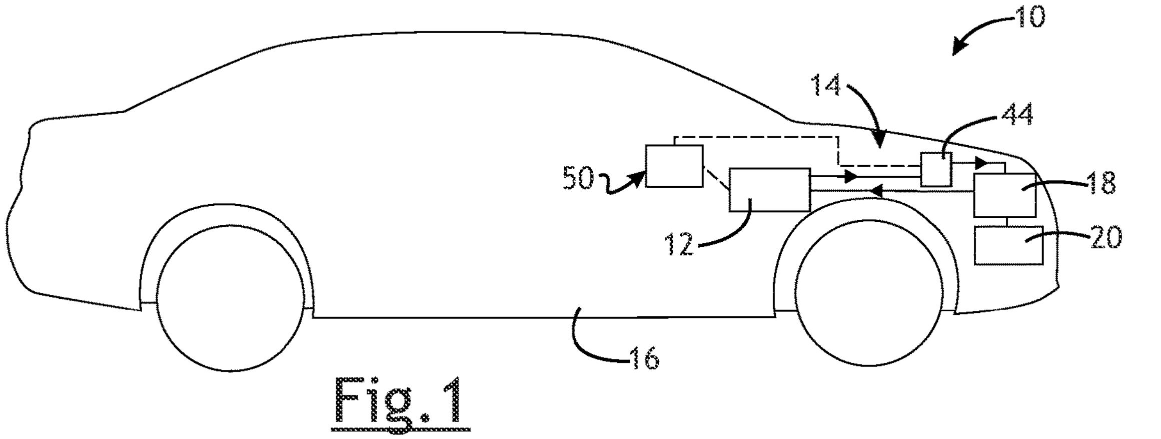
FIG. 1 is a diagrammatic view of a vehicle including an engine and an air intake system via which air is supplied to the engine.

Referring in more detail to the drawings, FIG. 1 illustrates a vehicle 10 having a combustion engine 12 in an engine compartment 14 of the vehicle body 16. In the engine 12, a mixture of air and fuel is ignited to generate motive power for the vehicle 10. Fuel may be provided to the engine 12 by one or more fuel injectors and air may be routed to the engine 12 via an air intake assembly 18. Engine coolant is circulated relative to the engine 12 and through a heat exchanger or radiator 20. The radiator 20 is a liquid-to-air heat exchanger by which heat in the coolant is conducted to the metal housing of the radiator 20, and the heat is radiated and transferred by convection to air surrounding the radiator 20 within the engine compartment 14. This reduces the temperature of the coolant flowing therethrough and increases the temperature of the surrounding air.

Figure 3:
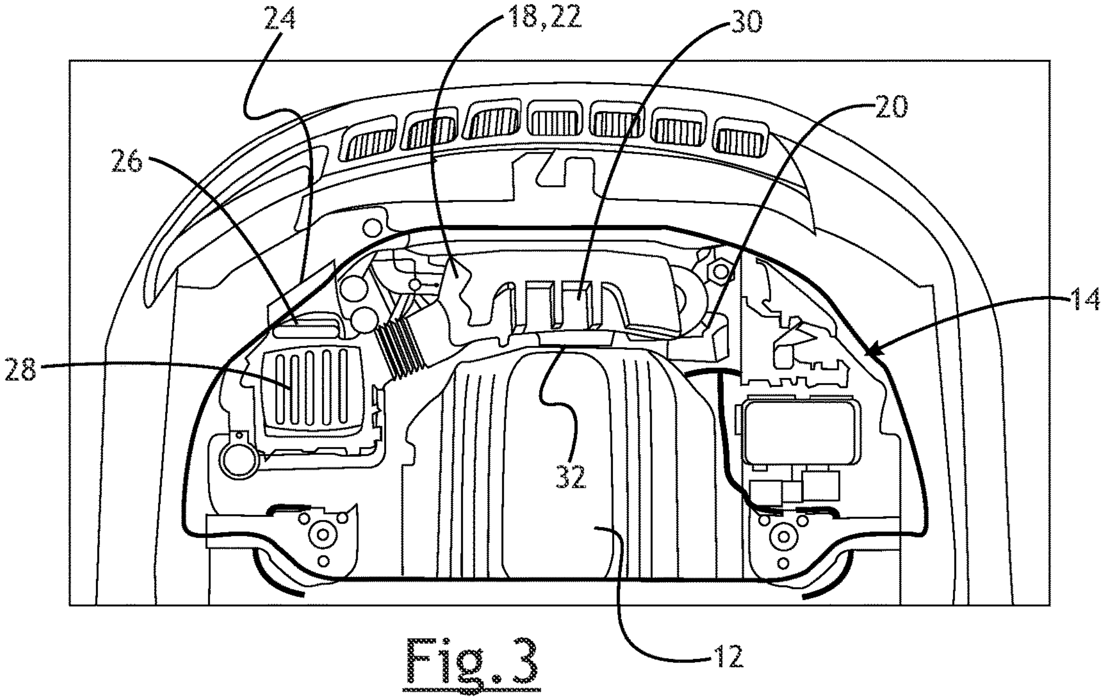
FIG. 3 is a plan view of a portion of a vehicle engine compartment.
Figure 5:
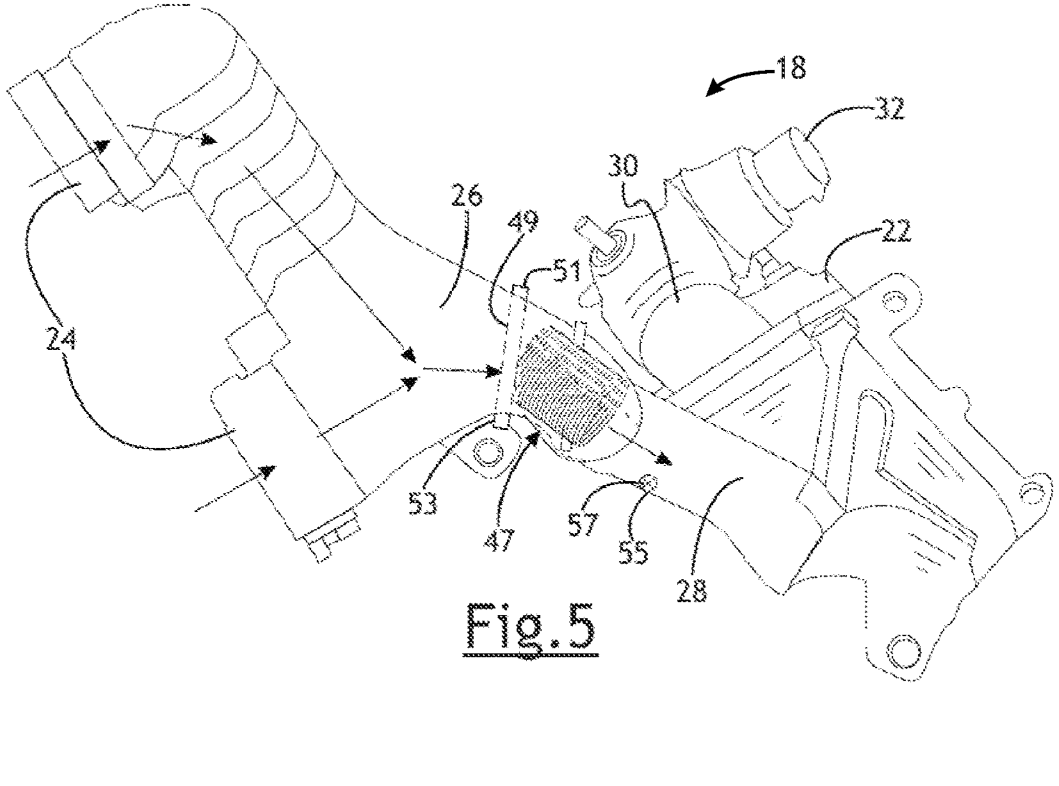
FIG. 5 is a perspective view of the air intake system.

As shown in FIGS. 3 and 5, the air intake assembly 18 may include a housing 22 received in the engine compartment 14 and having an inlet 24 through which air flows into the housing 22. The inlet 24 may be a port oriented to receive air flowing from the front of the vehicle 10 toward the rear of the vehicle 10. Air that enters the inlet 24 flows through an intake chamber or duct 26 to a filter 28 located within the housing 22, downstream of the inlet 24. The filter 28 removes contaminants from the air flow, and in use, a flow of filtered air exits the filter 28 and is directed by a clean air chamber or clean air duct 30 to an outlet 32 of the air intake assembly 18 from which filtered air exits the housing 22. Air that exits the housing 22 is routed to the engine 12 to support combustion in the engine 12.

Figure 4:
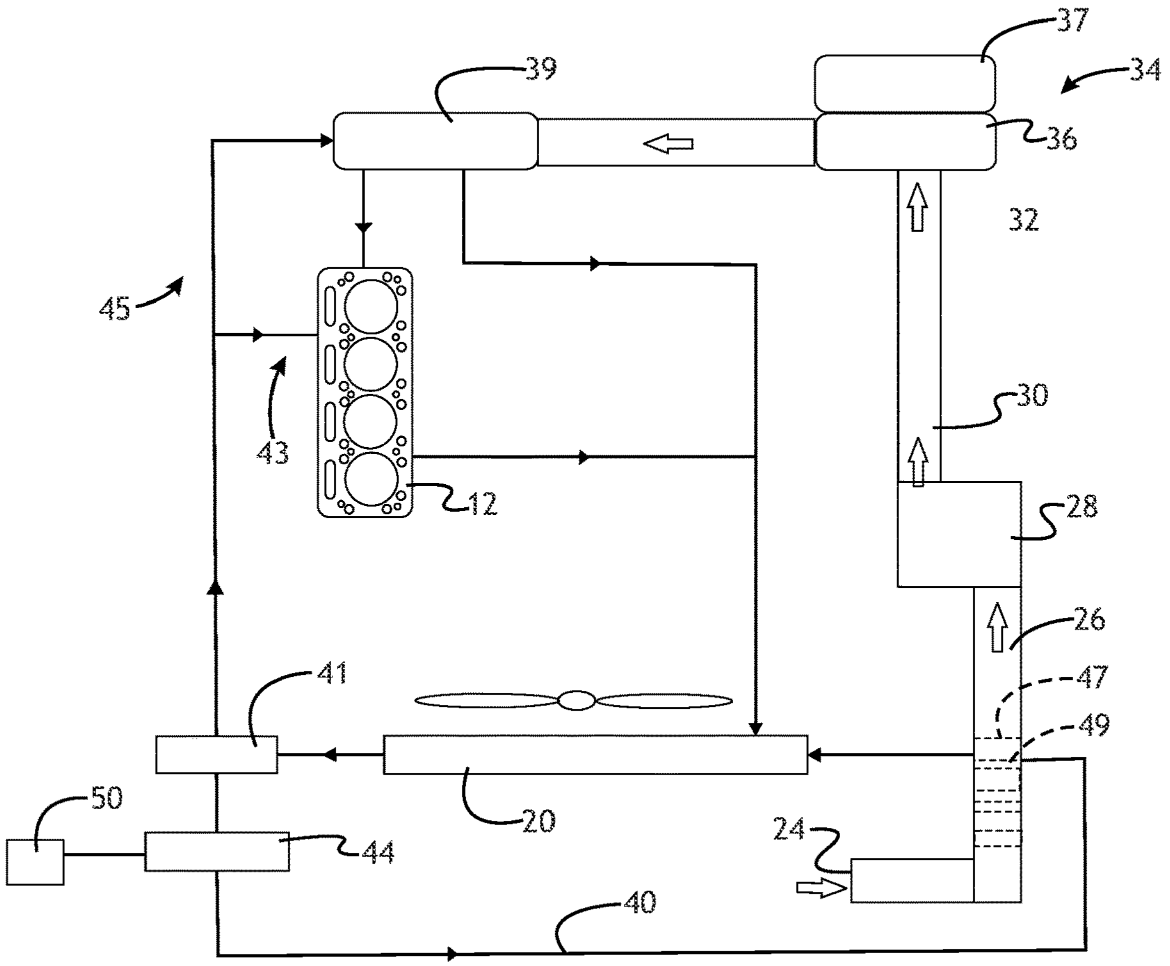
FIG. 4 is a schematic view of a system for selectively decreasing the temperature of an intake duct of an air intake assembly for a vehicle.

In at least some implementations, such as is shown in FIG. 4, the vehicle 10 includes a turbocharger 34 arranged between the outlet 32 of the air intake assembly 18 and the engine 12. The turbocharger 34 includes a compressor 36 arranged to discharge air at an increased pressure and provided an increased mass flow rate of air to the engine 12. The compressor 36 may be coupled to a turbine 37 that is driven, for example, by a flow of exhaust gas from the engine 12. The exhaust gases are at an elevated temperature, and air at higher temperatures is less dense and leads to reduce engine output for a given volume of air. For this reason, the vehicle 10 may include a heat exchanger 39 (e.g. an intercooler or charge air cooler), which may be a liquid-to-air (e.g. liquid coolant or water) heat exchanger, arranged to reduce the temperature of air delivered into the engine 12 for combustion. A charge air cooler 39 is shown in FIG. 4, in the flow or air between the turbocharger 34 and the engine 12.

To remove heat from the charge air cooler 39 and the engine 12, they may be coupled to one or more heat exchangers, shown as the radiator 20 in FIG. 4. The heat exchanger(s) 20 provide(s) from an outlet a lower temperature input coolant, that is driven by a pump 41, to an inlet of an engine coolant circuit 43 and an inlet of a charge cooler coolant circuit 45 (where the circuits may have portions in common, and they circuits may be in parallel or series arrangement). Higher temperature output coolant flows back to an inlet of the radiator 20 from outlets of the coolant circuits 43, 45. The temperature of the coolant is then reduced in the radiator 20 and returned to the inlets of the coolant circuits 43, 45 before being pumped back to the coolant circuits 43, 45. Additionally, other liquids used in the vehicle, like engine oil and transmission fluid, may also be routed to one or more heat exchangers arranged to reduce the temperature of these fluids.

Figure 2:
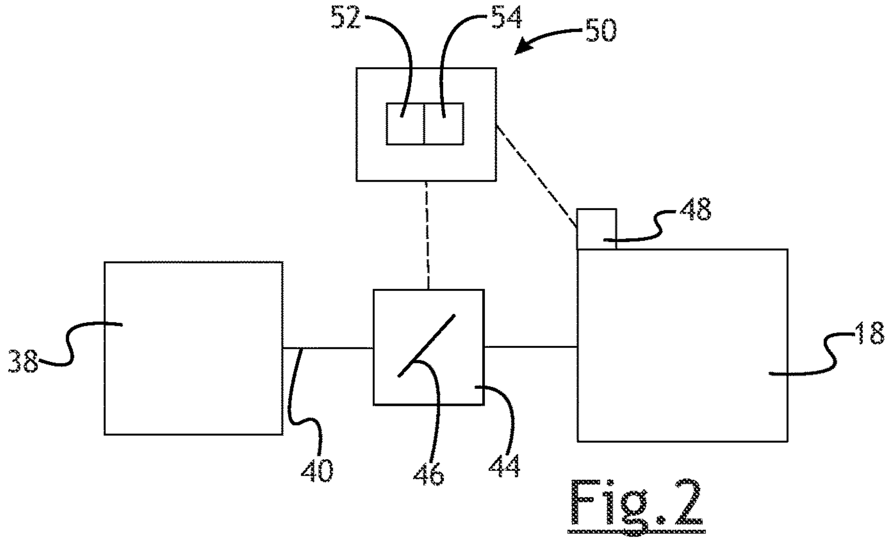
FIG. 2 is a diagrammatic view of a system for selectively decreasing the temperature within an intake duct of the air intake assembly.

In at least some implementations, as shown in FIG. 2, the system includes a source 38 of cooled liquid, and a conduit 40 communicated with the source 38 of cooled liquid, and with the intake duct 26 of the air intake housing 22. The cooled liquid source 38 may be a cooling circuit for one or more powertrain components of the vehicle, for example, the engine, transmission, turbocharger, charge cooler or intercooler which use liquids and heat exchangers to control the temperature of the liquids. The liquid from the liquid source and within the cooling circuits could be a coolant (as in the cooling circuits noted herein), engine oil, transmission fluid or the like.

The air intake housing 22 may include a heat exchanger 47 or a heat exchanger 47 may be received in part of the housing 22, such as in the intake duct 26, if desired. The heat exchanger 47 may be arranged in a heat transfer relationship with the intake duct and/or air therein and also or instead with other parts of the intake assembly 18, so that the liquid coolant decreases the temperature of air within the intake duct 26. In at least some implementations, this may be done by contact between the air and a heat conducting surface of the heat exchanger 47, such as a metal tube or metal body of the heat exchanger 47, or by conduction between the heat exchanger 47 and the housing 22 of the air intake assembly 18, where the heat exchanger 47 may be located outboard of and in contact with a wall defining part of the intake duct, in an implementation. The heat exchanger 47 may be a simple tube routed through part of the interior of the housing 22, such as in the intake duct 26, and the tube may be coiled, if desired, to increase the surface are of the tube within the interior, or the tube may engage a surface of the housing 22 without being located within the interior, or parts of the heat exchanger 47 may be located inside and outside the intake duct, if desired. As cooler liquid flows through a passage 49 (labeled in FIG. 4) defined by the tube or tubes of the heat exchanger 47, heat from the air or the housing 22 is transferred to the coolant flowing in the heat exchanger 47 and the temperature of the air decreases. In this way, the heat exchanger 47 is arranged in a heat exchange relationship within the flow of air in the housing 22, such as between the inlet 24 and the filter chamber 28 of the air intake housing 22, and air may directly contact a surface of the heat exchanger 47 or a surface the temperature of which is altered by the flow of liquid to the heat exchanger and air intake assembly. With the heat exchanger 47 at least partially associated with the intake duct 26, upstream of the filter 28, air therein can be cooled prior to being additionally heated by the engine 12 and other components in the engine compartment 14, to minimize the heat pick up by the air. Of course, the heat exchanger 47 could be also or instead associated with other parts of the intake assembly 18 to reduce the temperature of air flowing from the housing outlet 32.

In at least some implementations, the heat exchanger 47 may be integrally defined by the housing 22 wherein cooled liquid may be routed through a chamber or passage formed in the housing 22 which acts as a heat exchanger when liquid is route therethrough. The chamber or passage 49 is separate from the interior of the intake duct 26 so that the cooled liquid does not enter the interior of the intake duct 26 or flow to the filter 28. In such an arrangement, an inlet 51 to the chamber or passage 49 would receive the cooled liquid which would flow out of the chamber or passage and back to the radiator 20 through an outlet 53. Here, the walls or surfaces defining the interior of the intake duct 26 would be cooled by the liquid in the chamber or passage 49 and this would decrease the temperature within the intake duct 26. Improved heat transfer can occur with material of the heat exchanger 47 (which may be a portion of the intake duct 26 or a separate structure located at the housing 22) having higher thermal conductivity. Any water in the intake duct (e.g. from rain or melted snow) may exit the housing through a drain opening 55 (FIG. 5) that may be located in a lowest area of the intake duct, relative to gravity and the orientation of the housing when installed in a vehicle.

In at least some implementations, cooled liquid is provided to the intake duct 26 only some of the time and not continually. In such implementations, a valve 44 may be provided to selectively permit and prevent, or at least significantly inhibit, liquid flow from the conduit 40 and to the air intake housing 22. The valve 44 may be electrically actuated, such as by including or being driven by a solenoid, to move between a first position and a second position, in which a greater flow of liquid is permitted than when the valve 44 is in the first position. The valve 44 may have a valve head 46 received within the conduit 40, and in the first position the valve head 46 may mostly or fully block the flow area of the conduit 40 to inhibit or prevent liquid flow therethrough. In the second position, the valve head 46 is moved relative to the first position and a greater effective flow area is provided between the valve head 46 and the conduit 40 than when the valve head 46 is in the first position. Flow area, as used herein, is a cross-sectional area through which liquid may flow within the conduit 40 and around the valve head 46. In the first position, the valve head 46 may reduce the effective flow area of the conduit 40 by 90% or more, including up to 100%, in at least some implementations.

In at least some implementations, the valve 44 is controlled in response to a temperature, which may be determine by a temperature sensor 48, and the valve 44 may be closed when the temperature is below a temperature threshold, and the valve 44 may be opened when the temperature is above the temperature threshold. The temperature threshold may be set with regard to a temperature at or above a temperature of the coolant that can be provided to the housing 22. The temperature may be an ambient temperature (e.g. temperature outside the vehicle 10) alone or in conjunction with a time of operation of the engine, where the engine and related components give off heat that increases the temperature of the housing 22. The temperature may also or instead by a temperature at or near the air intake housing 22, which may include within the intake duct 26 of the air intake housing 22. In this regard, the temperature sensor 48 may be a sensor used to provide an indication of ambient temperature within the area of the vehicle 10, such as via an infotainment system of the vehicle 10, may be obtained from a weather information source (e.g. via a telematics unit of the vehicle 10), may be a temperature sensor 48 used by other vehicle systems (e.g. to sense the temperature of part of the engine 12, engine coolant or engine oil) or may be a dedicated temperature sensor used for the purpose of controlling the valve 44. For example, a temperature sensor 48 may be mounted to the housing 22 and may have a portion exposed to air within the intake duct 26 or otherwise be arranged to be responsive to the temperature within the intake duct 26. The temperature sensor 48 may provide an output indicative of the temperature within the intake duct 26, which may be a direct measurement or determination of that temperature or which may be inferred from other temperatures and or time or other information relating to use of the vehicle 10.

To control the valve 44, the system includes a control system 50 with a controller 52 that is communicated with the temperature sensor 48 and with the valve 44. The controller 52 is operable to open the valve 44 when the output of the temperature sensor 48 indicates a temperature that satisfies a temperature threshold (e.g. is at or above the temperature threshold), and to close, or permit the valve 44 to move to the closed position such as under the force of a biasing member like a spring, when the temperature does not satisfy the temperature threshold (e.g. is below the temperature threshold). In the example wherein the valve 44 includes a solenoid, the controller 52 may selectively provide electricity to the valve 44 to selectively drive the valve 44 and change the position of the valve 44.

In at least some implementations, it may be desirable to decrease the temperature within the intake duct 26 only in conditions in which snow or ice are not able to collect or form within the intake duct 26 to prevent a partial or full blockage of the intake duct by snow or ice. In such cold conditions, no cooling of the intake duct 26 should take place to avoid snow accumulation or ice from developing in the intake duct. In some implementations, the gain from cooling the intake air may not be worth the diversion of coolant from other components unless the temperature in the air duct is above a threshold that is significantly higher than the temperature at which water freezes. In general, it may be desirable to provide colder air to the engine 12 and so, in at least some implementations, decreasing the temperature in the intake duct 26 by routing cooled liquid to the intake duct 26 may be done as desired during engine operation. In at least some implementations, the threshold temperature is between twenty-seven degrees Celsius and forty degrees Celsius, or the threshold temperature may be set as a function of the ambient temperature, for example, five degrees Celsius above the ambient temperature.

In order to perform the functions and desired processing set forth herein, as well as the computations therefore, the control system 50 may include, but is not limited to, one or more controller(s), processor(s), computer(s), DSP(s), memory, storage, register(s), timing, interrupt(s), communication interface(s), and input/output signal interfaces, and the like, referred to be reference numeral 52 in FIG. 2, as well as combinations comprising at least one of the foregoing. For example, the control system 50 may include input signal processing and filtering to enable accurate sampling and conversion or acquisitions of such signals from communications interfaces and sensors. As used herein the terms control system 50 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. The control system 50 may be distributed among different vehicle modules, such as an infotainment control module, engine control module or unit, powertrain control module, transmission control module, and the like, if desired.

The term "memory" or "storage" as used herein can include volatile memory and/or non-volatile memory, generally referred to by reference numeral 54 in FIG. 2. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

Figure 6:
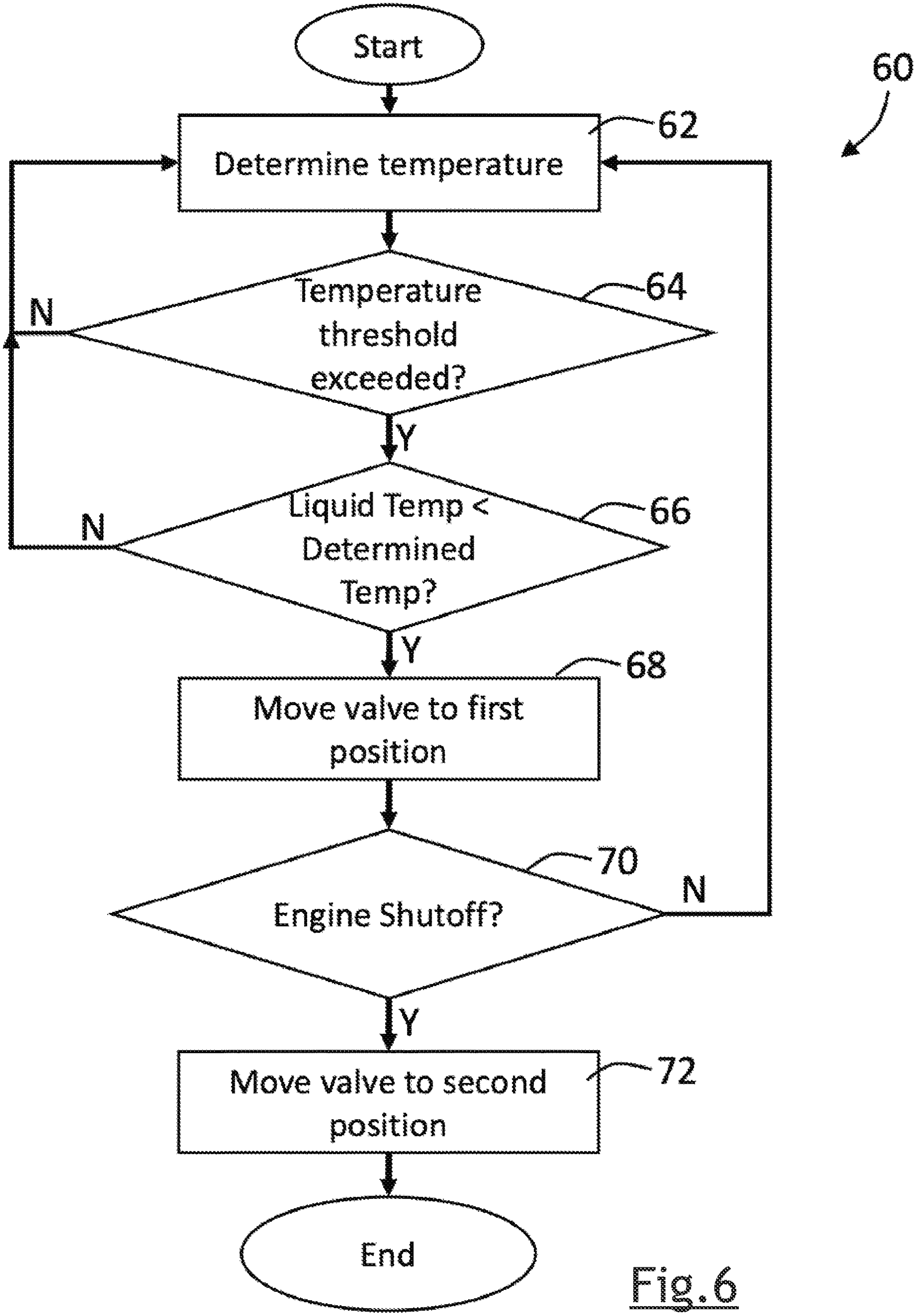
FIG. 6 is a flowchart of a method for selectively decreasing the temperature within an intake duct of an air intake assembly.

FIG. 6 illustrates a method 60 of selectively decreasing the temperature within an air intake assembly 18 of a vehicle 10. The method 60 may be run after the vehicle 10 is turned on (e.g. keyed on, or engine started, or the like) and in step 62, a temperature is determined. The temperature may be determined from information from any suitable temperature indicator, which may be a source of temperature data within or remotely located from the vehicle 10, or a temperature sensor 48 of the vehicle 10, for example and as noted herein.

Next, in step 64, the determined temperature is compared to a threshold temperature. If the determined temperature is less than the threshold temperature, then the method 60 may loop back to step 62 to redetermine the temperature, which may occur after expiration of a time period, if desired.

In other example methods, the system may assume a temperature increase in the air intake assembly 18 occurs after a certain amount of time after the engine 12 has been operating, and after this time, the method 60 may move the valve 44 to the first position during remaining operation of the engine, and the valve 44 may be moved to the second position (in step 72) after the engine is shut off, as determined in step 70, and the method may then end. This assumption of temperature increase may be made based on empirical data taken over time and related to the temperature within the engine compartment 14 of the vehicle 10 as a function of operation of the engine 12, engine oil temperature or other engine temperature, or the like, which may be mapped or otherwise determined as a function of or independently of an ambient temperature. The time period may be varied based upon the difference between the determined temperature and the threshold temperature, with a greater time period provided when the determined temperature is lower.

For example, if the determined temperature is twenty degrees Fahrenheit below the threshold temperature, then the method 60 may cause the valve 44 to be closed (in the second position) for a predetermined time period deemed sufficient to ensure that the temperature within the intake duct 26 increases at least ten degrees before the valve 44 is opened (moved to the first position). In this example, when the determined temperature is five degrees Fahrenheit below the threshold temperature, the time period might be less. In this way, further iterations of redetermining the temperature and comparing the redetermined temperature to the threshold temperature are not needed. This may facilitate use of ambient temperature such as may be determined by a temperature sensor 48 of the vehicle 10 or a remote temperature/weather data source, or an engine temperature, to conveniently be used to determine when the valve 44 should be opened so that a dedicated temperature sensor is not needed for the air intake assembly 18 in some implementations.

If in step 64 the determined temperature is higher than the threshold temperature, then the method 60 continues to step 66 in which it is determined if the liquid coolant temperature is less than a coolant threshold, which in this example, is less than the determined temperature from step 62. If the liquid temperature does not satisfy this threshold, then the method may loop back to step 62, if desired, as the liquid is not cool enough to reduce the temperature in the inlet duct. If the liquid temperature satisfies the threshold in step 66 then the method 60 continues to step 68 in which the valve 44 is moved to the first position (e.g. opened) to permit liquid flow, or an increased liquid flow, from the cooled liquid source 38 to the air intake assembly 18.

The method 60 may function to leave the valve 44 open during remaining engine operation, and upon determining that the engine has been shut off in step 70, the valve 44 may be closed in step 72 as the method ends. In some implementations, the method 60 may loop back to step 62 one or more times after the valve 44 is opened in step 68 to check the temperature associated with the intake duct and ensure that the temperature remains above the threshold. In this way, if the system cools down in use, then the valve may be closed as noted herein.

The systems and method herein can, among other things, decrease the temperature of air within the intake duct of the air intake assembly to increase the density of the air and improve the efficiency and performance of the engine. The system may intelligently control a flow of cooled liquid to the air intake assembly to decrease the temperature within the air intake assembly only when needed and avoid wasting energy and diverting liquid flow within the system when not needed.

What is claimed is:

1. A vehicle system, comprising:

an air intake assembly including a housing having an interior and an inlet through which air flows into the interior, a filter is located downstream of the inlet, and an outlet is located downstream of the filter through which air from the filter flows;

a liquid source;

a passage arranged to receive liquid from the liquid source, the passage is in heat transfer relationship with the housing and the passage is outside of the interior;

a valve that is electrically actuated and arranged to selectively permit liquid flow from the liquid source to the air intake assembly through the passage;

a temperature indicator providing an indication of a temperature in the air intake assembly upstream of the filter; and a controller communicated with the temperature indicator and the valve and operable to open the valve when the output of the temperature indicator indicates a temperature above a temperature threshold.

2. The system of claim 1 wherein the valve is closed when the temperature in the air intake assembly upstream of the filter is below the temperature threshold.

3. The system of claim 1 wherein the liquid source is a cooling circuit associated with an engine of the vehicle and wherein the liquid flows from the cooling circuit to the valve.

4. The system of claim 1 wherein the passage is formed in a wall of the housing, the interior of the housing is defined by one or more surfaces of the wall and the one or more surfaces of the wall are located between the passage and the interior.

5. The system of claim 4 wherein the housing defines an intake duct between the inlet and the filter, and the passage is provided at least in part within the intake duct.

6. The system of claim 4 wherein the passage is defined at least partially within a tube of a heat exchanger, and the tube is engaged with the housing outside of the interior for conduction of heat between the material of the housing and the heat exchanger.

7. The system of claim 1 which also includes a pump that moves the liquid under pressure from the liquid source and to the valve.

8. The system of claim 1 wherein the temperature indicator is responsive to a temperature between the inlet and the filter within a housing of the air intake assembly.

9. The system of claim 1 wherein the temperature indicator is a sensor responsive to a temperature associated with the liquid, or with an engine of the vehicle, or wherein the temperature indicator provides information regarding an ambient temperature outside of the vehicle.

10. A method of selectively decreasing the temperature within an air intake for an engine, comprising:

determining a temperature indicative of a temperature in an air intake assembly;

comparing the temperature to a temperature threshold; and providing, when the determined temperature does not satisfy the temperature threshold, flow of a liquid from a liquid source to an air intake assembly through which air is delivered to an engine to support combustion in the engine, wherein the liquid is maintained separate from the air flow through the air intake assembly and the liquid is routed outside of an interior of the air intake assembly.

11. The method of claim 10 wherein providing the flow of the liquid is accomplished by opening a valve to permit the liquid to flow through the valve to the air intake assembly.

12. The method of claim 11 wherein the valve includes a solenoid, and the valve is opened by providing electricity to the valve and the valve is located at least partly in a conduit between the liquid source and the air intake assembly.

13. The method of claim 10 wherein the flow of the liquid is provided for a predetermined period of time, and wherein the valve is closed after the predetermined period of time.

14. The method of claim 13 wherein the period of time varies as a function of the magnitude of a difference between the temperature and the temperature threshold.

15. The method of claim 10 wherein the liquid source is a cooling circuit including a heat exchanger of the vehicle.

16. The method of claim 15 wherein the liquid in the cooling circuit flows to and from an engine of the vehicle.

17. The method of claim 10 which also includes determining a temperature of the liquid and wherein the step of providing the flow of liquid occurs when the determined temperature does not satisfy the temperature threshold and when the temperature of the liquid is below a liquid temperature threshold.

18. The method of claim 17 wherein the determined temperature is a temperature of air within the intake duct.

19. The method of claim 17 wherein the determined temperature does not satisfy said temperature threshold when the determined temperature is above said temperature threshold, and wherein the liquid temperature threshold is less than said temperature threshold.

20. The method of claim 19 wherein the determined temperature is a temperature of air within the intake duct.

* * * * *